Nov. 6, 1934.  H. E. PEREZ  1,979,488
AUTOMATIC PNEUMATIC GEAR SHIFT
Filed April 8, 1932   2 Sheets-Sheet 1
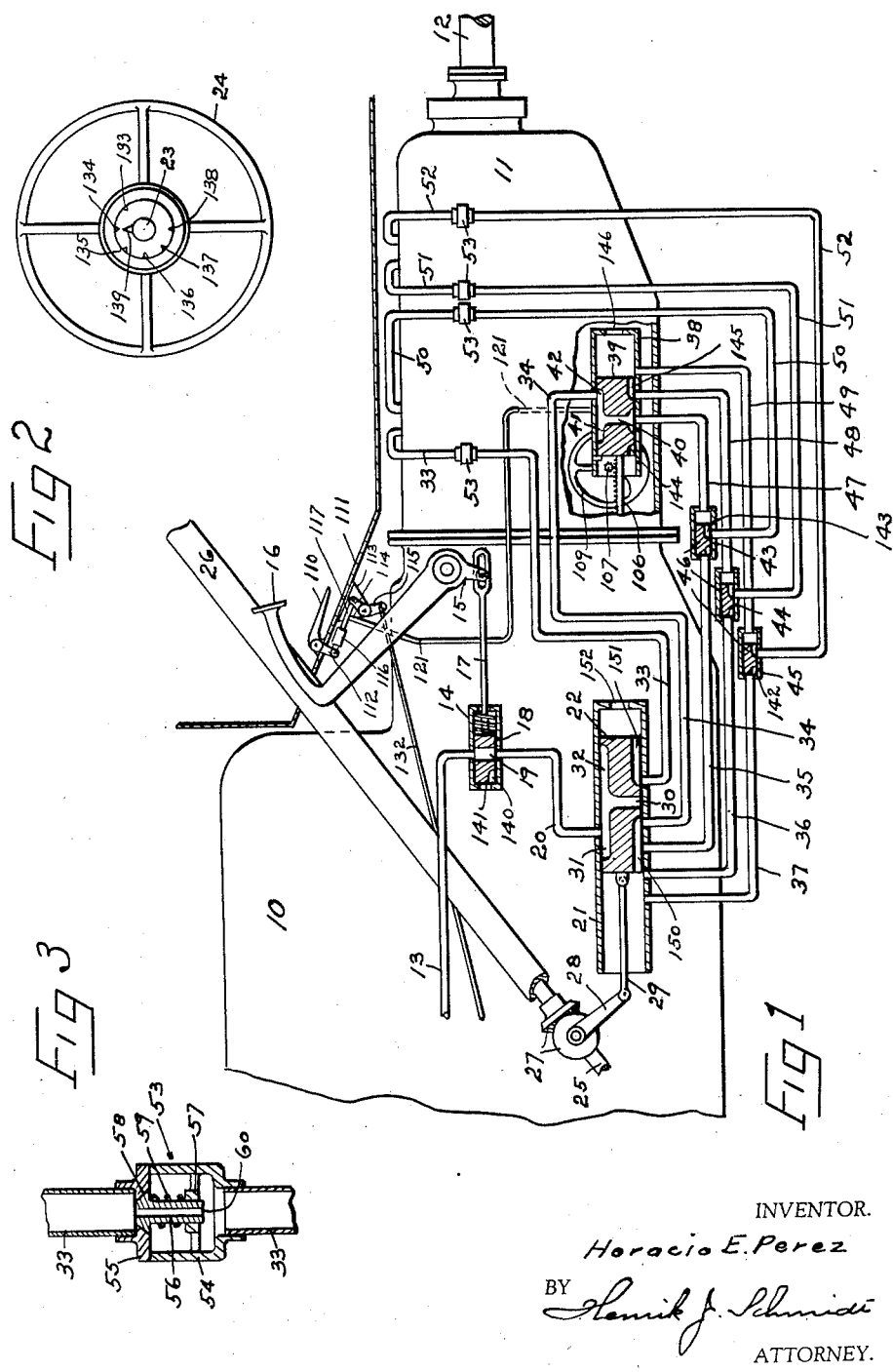
INVENTOR.
Horacio E. Perez
BY
ATTORNEY.

Nov. 6, 1934.  H. E. PEREZ  1,979,488
AUTOMATIC PNEUMATIC GEAR SHIFT
Filed April 8, 1932   2 Sheets-Sheet 2
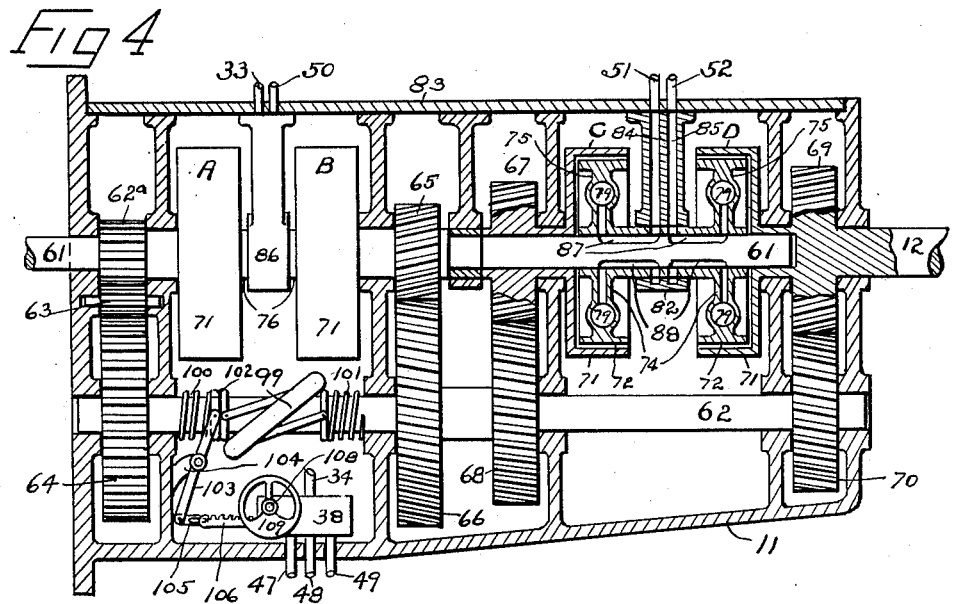
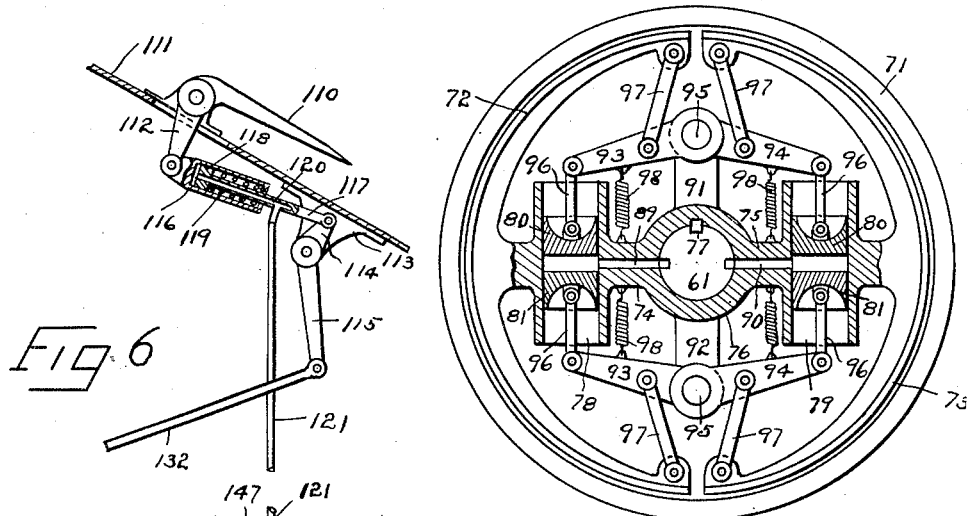
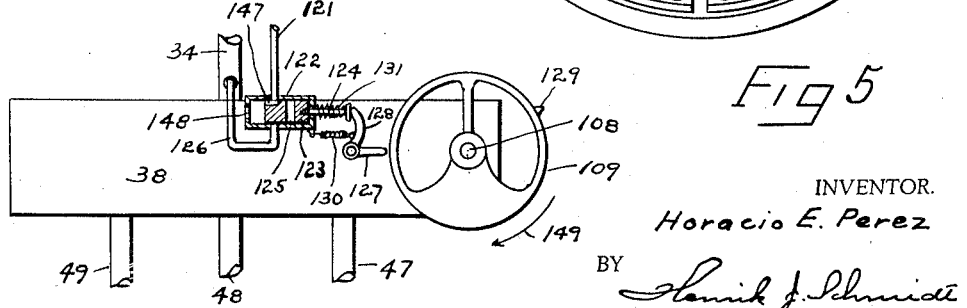
INVENTOR.
Horacio E. Perez
BY
ATTORNEY.

Patented Nov. 6, 1934

1,979,488

UNITED STATES PATENT OFFICE 1,979,488

AUTOMATIC PNEUMATIC GEAR SHIFT

Horacio E. Pérez, New York, N. Y.

Application April 8, 1932, Serial No. 603,974

9 Claims. (Cl. 192—.01)

This invention relates to gear shift mechanisms particularly such as are used on automotive vehicles, but it may be put to other uses. It has for one of its principal objects to provide a gear shift mechanism, pneumatically operated, through the instrumentality of which the various gears in the mechanism may be made operative or inoperative by the mere setting of an indicator, or by the mere operation of the accelerator of the engine on the vehicle on which the mechanism is employed.

Another object is to so construct the mechanism that the foot clutch, now commonly used, is eliminated; that each gear employed is always in mesh with its co-acting member; and that all the gears will automatically return to neutral whenever the foot brake, or the emergency brake, is applied. A further object is to provide means which positively assure the complete disengagement of one set of gears before another set is engaged. A still further object is to provide means for automatically and momentarily throttling the engine while the change from one set of gears to another takes place. Other objects are to provide a gear shift mechanism which is noiseless in its operation, which greatly relieves all strain on the parts with which it is connected, which has no parts easily broken or apt to get out of order, which may be operated with but slight skill on the part of the driver, which is suitable for all makes of automotive vehicles, and which can be manufactured at a relatively low cost.

These and various other objects and advantages will be readily understood from the following description and from the accompanying drawings of a preferred embodiment of the invention in which, however, modifications may be made without departing from the scope of the appended claims. In the drawings Fig. 1 is a side elevation of parts of the mechanism shown attached to a fragment of an automobile engine and its gear casing,—the view being somewhat diagrammatic with certain parts shown in section;

Fig. 2 a plan view of a steering wheel;

Fig. 3 a cross-sectional elevation of one of the valves used in the mechanism;

Fig. 4 a cross-sectional side elevation of the gear casing and its mechanism;

Fig. 5 a cross-sectional view of one of the clutches employed; and

Fig. 6 a side elevation of the throttle-actuating mechanism, certain parts being shown in section.

The views are drawn to various scales.

Referring first to Figs. 1 and 2, a fragment of an automobile engine is shown at 10, its gear casing at 11 and its drive shaft at 12. The power source which actuates the mechanism may be either a tank of compressed air or an air compressor. As either of these means are well known, they are not shown on the drawings.

The compressed air flows from the tank, through a pipe 13, to a brake controlled valve 14. This valve, which is connected to an arm 15 on the brake pedal 16 by a piston rod 17, has a piston 18 with a substantially centrally located port 19 which aligns with the pipe 13 when the brake pedal is in its inoperative position. The port also aligns with a pipe 20 which carries the compressed air to a direct-shift valve 21, the piston 22 of which is actuated by turning a knob 23 on the steering wheel 24.

The knob is connected on the end of a rod 25, which passes through the steering column 26; and a pair of bevel gears 27, a lever 28 and a piston rod 29 connect the rod 25 with the piston. The lever 28 is rigidly secured to one of the bevel gears. The piston 22 has a centrally located port 30 which terminates, at its upper end, in sidewardly extending air passages 31 and 32. Five pipes 33, 34, 35, 36 and 37 lead from the cylinder 21.

Referring now also to Fig. 4, the pipe 33 leads to the "reverse" clutch A in the gear casing 11. The manner in which the pipe connects with the clutch as well as the operation of the clutch will be explained later.

The pipe 34 leads to an automatic-shift valve 38 which is mounted in the lower part of the gear casing. This valve has a piston 39 which is provided with a centrally located port 40 which terminates in sidewardly extending air passages 41 and 42 at its upper end. The pipes 35, 36 and 37 lead, respectively, to what may be termed "selective" air valves 43, 44 and 45. All of these valves are similarly constructed and each has a plunger 46. Pipes 47, 48 and 49 lead from the automatic-shift valve 38 to the other ends of the "selective" air valves. A pipe 50 leads from the bottom of valve 43 to clutch B, a pipe 51 from valve 44 to clutch C, and a pipe 52 from valve 45 to clutch D.

What may be termed a "clutch" valve 53 is inserted in each of the pipes 33, 50, 51 and 52. The construction of this valve is shown in Fig. 3. It consists of a valve body 54 and a cover 55. A valve stem 56 is slidingly mounted in a spider 57 which is cast integrally with the valve body. The valve stem, which is conical at its upper end, is held against a conical seat 58 by a light compression spring 59. A small air passage 60 is drilled through the valve stem. The purpose of these clutch valves will be explained later.

Referring now particularly to Fig. 4 which shows the interior of the gear casing, the engine shaft is shown at 61 and the counter shaft at 62. These shafts are mounted in a series of bearings, as plainly shown. Clutch A controls the "reverse" gears 62A, 63 and 64; clutch B the "first speed" gears 65 and 66; clutch C the "second speed" gears 67 and 68; and clutch D the "high speed" gears 69 and 70. As all the clutches are constructed alike, only one needs to be described. Reference is now had to Fig. 5 and clutches C and D in Fig. 4.

Each clutch consists of a housing 71 which in the instance of clutch C is cast integrally with the gear 67 and in the instance of clutch D integrally with gear 69. The gear 69 is also cast integrally with the drive shaft 12. Each housing contains a pair of pressure shoes 72 and 73 which are connected by arms 74 and 75 to a hub 76 which is secured by a key 77 to the engine shaft 61. The hub 76 is cast integrally with the pair of pressure shoes in both clutches C and D. In like manner, the clutches A and B are operated by pairs of pressure shoes connected on one hub.

Cylinders 78 and 79 are formed in the arms 74 and 75 and in these cylinders, pistons 80 and 81 are actuated. The hub 76 rotates in a bearing 82 which is suspended from the gear casing cover 83. Air passages 84 and 85 are formed in this bearing. The pipes 51 and 52 are connected to these air passages. The bearing 86, associated with clutches A and B, has similar air passages to which pipes 33 and 50 are connected. The air passages 84 and 85 surround the hub 76 and pass through this hub. They terminate in side-extending air passages 87 and 88 which are milled in the shaft 61. The cylinders 78 and 79 are connected with the air passages in the shaft by means of passages 89 and 90 which are formed in the arms 74 and 75.

Another pair of arms 91 and 92 are cast on the hub 76. On the outer ends of each of these arms levers 93 and 94 are pivoted on pins 95. The outer ends of the levers are connected to the pistons by connecting rods 96, while links 97 connect the levers with the outer, flexible ends of the pressure shoes 72 and 73. Springs 98 tend to hold the pistons in their inner or inactive, positions.

A centrifugal governor 99 is slidably mounted on and turns with the countershaft 62. It is held between two springs 100 and 101 which are compressed as the speed of the shaft increases. A sliding collar 102 is mounted on the shaft between the spring 100 and the governor. As it slides it actuates a double lever 103 which is pivoted on a bracket 104. The lower end of the lever 103 is connected, by means of a slotted link 105, to the piston rod 106 of the piston 39 in valve 38. The piston rod 106 is constructed in the form of a gear rack and the teeth of this rack engage a pinion 107 which is rigidly mounted on a shaft 108, which in turn is mounted in the front part of the cylinder 38. The pinion 107 is shown in Fig. 1. Balance wheels 109 are secured on the outer ends of the shaft 108.

Referring now to Figs. 1 and 6, particularly to Fig. 6. The accelerator pedal of the car is shown at 110. It is connected to the floor board 111 and has an arm 112 which extends through a slot in this board. A bracket 113 is mounted under the floor board and on this a bell crank, having a short arm 114 and a long arm 115, is pivoted. A cylinder 116 is pivoted at one end to the arm 112, while a piston rod 117, carrying a piston 118, is pivoted to the arm 114 of the bell crank. The piston is engaged in the cylinder and a compression spring 119 tends to hold it in its inner position in the cylinder.

An air passage 120 is formed through the piston and piston rod and is connected, by means of a pipe 121, to a "throttle" air valve 122 which is connected on, or near, the valve 38. The throttle valve is provided with a piston 123 which has a piston rod 124 and a centrally located port 125. A pipe 126 leads from the pipe 34 to the lower side of the valve. A bell crank, having a straight arm 127 and a curved arm 128, is pivoted on the valve 38. This bell crank is actuated by a projection 129 which is located on the rim of the balance wheel 109, and which engages with the straight arm 127 when the wheel is turned in the direction indicated by the arrow 149 in Fig. 6. The curved arm 128 is held against the piston rod 124 by a tension spring 130, while the piston rod 124 is held in its outermost position by a compression spring 131. The spring 130 being just of sufficient strength to assure that the arm 128 at all times engages with the end of the piston rod 124. A rod 132 connects the arm 115 with the valve of the carburetter on the vehicle.

The mechanism operates in the following manner. As previously stated, the compressed air is supplied by a tank or an air compressor and is delivered through pipe 13 to brake controlled valve 14. If the brake is not set the air will flow through port 19, pipe 20, and into the directshift valve 21. If the brake is set so that the piston 18 is moved forward, the piston closes the opening in pipe 13 and no air will flow through the valve. As the movement of the brake pedal is in excess of the movement required by the piston 18, an elongated slot is provided in the front end of the piston rod 17 to compensate for this excess movement.

A number of notches 133, 134, 135, 136, 137 and 138 are impressed on a dial mounted on the steering wheel 24. Notch 133 represents "reverse", 134 "neutral", 135 "forward", and 136, 137 and 138 represent, respectively, "first", "second" and "third" speeds. Assuming now that the knob 23 is turned so that the indicator 139 points to notch 133, or "reverse". In turning the knob the rod 25 is rotated; and, through the instrumentalities of the bevel gears 27, arm 28 and piston rod 29, the piston 22 is moved further into the valve 21 so that the port 30 will align with the pipe 33 which is connected with the "reverse" clutch A in the gear casing. If the port 19 is open, the air will flow through pipe 20, passage 31, port 30, pipe 33, valve 53, and into the clutch mechanism of clutch A.

It will be borne in mind that the construction of all the clutches is alike. Therefore, to facilitate the explanation, the description will now refer to clutch C, shown in Fig. 4 and to the clutch shown in Fig. 5 only. From the pipe 33 the air flows through air passage 84, side passages 87 and 88, passages 89 and 90 (which are formed in arms 74 and 75), and into the cylinders 78 and 79. As the air is forced between the pistons 80 and 81 these are forced outwardly and thus, through the action of connecting rods 96, arms 93, and links 97, the ends of the pressure shoe 72 are forced against the inner side of the clutch housing 71.

Similarly the ends of the pressure shoe 73 are forced against the housing by the action of the pistons in cylinder 79. When the friction between the pressure shoes and the housing reaches a sufficient degree, the housing is turned and consequently the gear (in this instance 62A) is turned with it; thus imparting motion to idler 63, gear 64, countershaft 62, gear 70, gear 69 and drive shaft 12.

After the reverse movement is finished, and when the brake pedal 16 is depressed, the piston 18 is drawn forward so that the port 19 is closed. However, as the piston is drawn to its extreme forward position, an air passage 140, formed in the piston 18, is aligned with the pipe 20, and through this air passage, the air confined in the clutch cylinders will escape through an opening 141 drilled in the rear of the brake controlled valve 14.

If reference is now had to Fig. 3, it will be seen that as the air passed through the valve 53, on the pipe 33, to actuate the clutch pistons, it was compelled to move slowly through the restricted air passage 60 in the valve stem 56. This caused the air to flow slowly into the clutch cylinders. However, when the air was released from the cylinders it compressed the valve stem 56, causing the air to flow rapidly through the valve seat 58, thus releasing the clutch almost instantaneously upon the depression of the brake pedal 16. As these valves are used on all the pipes leading to the cylinders in the different clutches, all of the clutch cylinders receive the air at a slow rate and release it at a high rate. This assures the positive release of one clutch before another can engage. The importance of this feature will be more obvious when the action of valve 38 is explained.

Assuming now that the knob 23 is turned so that the indicator 139 points to notch 138. In this instance the piston 22, in the valve 21 will be drawn forward until the port 30 aligns with the pipe 37. The air will then flow through port 19, pipe 20, passage 32, port 30, pipe 37, and into the selective air valve 45. As the air strikes the plunger 46 in this valve the plunger is pushed forward so that the air passage 142 will allow the air to flow into pipe 52; at the same time sealing the pipe 49. The air flowing through pipe 52 passes through valve 53 and enters the cylinders in the clutch D and actuates the pistons in the manner previously described.

By moving the indicator 139 to other notches, the air may be caused to flow through either pipe 35 or 36, and hence be caused to operate clutches B or C. The action in either instance is the same as previously explained.

If the indicator is set to the notch which will align the port 30 with pipe 34, the air will flow through this pipe and into the "automatic shift" valve 38. Normally this valve will be in the position shown in Fig. 1, so that the air will flow from pipe 34 through passage 42, the port 40 in the piston 39, and, finally through pipe 47, into selective valve 43. The air flowing out of pipe 47 will cause the plunger 46 in the valve 43, to assume the position shown on the drawing; so that the air may flow through air passage 143 and into pipe 50 from whence it is led through valve 53 to the clutch cylinders in clutch B, thus operating this clutch. The reason for terming the valve 38 an "automatic shift" valve, is that this valve automatically shifts the gears to higher or lower speeds as the throttle is manipulated. This shifting is accomplished in the following manner.

Assuming that the car is in low speed and that the engine is accelerated so that the countershaft 62 revolves more rapidly. Centrifugal force acting on the governor 99 will cause it to slide the collar 102 against the compression spring 100, so that the lever 103 will rock and consequently, through the link 105 and the piston rod 106, cause the piston 39 to move further into the valve 38. This movement of the valve will cause the port 40 to align with the pipe 48 so that the air will flow through this pipe and through selective valve 44 into pipe 51 from whence it will enter the clutch cylinders in clutch C and thus actuate this clutch. It will be noted that when the piston moves as just described, the pipe 47, through which the air formerly flowed, will then be aligned with an air passage 144 formed in the piston 39. By the action of the valve 53 the clutch cylinders of clutch B are rapidly emptied of their air, through the passage 144, before the clutch C is engaged. The movement of the piston 39 to the place where the port 40 will align with pipe 49 is accomplished in a similar manner. Such movement will disengage clutch C and engage clutch D.

If a certain clutch is engaged and the acceleration of the engine is lessened, the reverse action of what has just been explained will take place; the piston 39 will move in the opposite direction so as to change from a high-speed clutch to a lower speed clutch. In this instance the air confined in the cylinders of the clutch to be disengaged will flow through air passage 145 and out through the opening 146 drilled in the rear of the valve 38. The object of the balance wheels 109, which, as previously explained are actuated by a pinion 107 and the teeth on the piston rod 106, is to store up potential energy for imparting rapid and positive motion to the piston 39.

As it is advantageous to momentarily throttle the engine while a shift of gears is being made, the throttling device shown in detail in Fig. 6 is employed. Ordinarily when the throttle pedal 110 is depressed the rod 132 actuates the throttle valve and opens it wider. The compression spring 119 is of sufficient strength to hold the piston 118 against the inner end of the cylinder 116 so that the cylinder and piston rod 117 act as a connecting link between the arms 112 and 114. When a gear shift is about to be made from a lower to a higher speed, the projection 129 on the balance wheel 109, as this wheel turns, engages with the arm 127 and thus, through the arm 128 and piston rod 124, moves the piston 123 until the port 125 aligns with the pipes 126 and 121.

In this position air will flow from pipe 34 through pipe 126, port 125, pipe 121, air passage 120, and into the cylinder 116. The air will cause the piston to move outward in the cylinder, thus causing a movement to the arms 114 and 115, and consequently cause rod 132 to close the throttle valve. As soon as the balance wheel returns to its normal position, the piston 123 moves and the air from the cylinder 116 escapes through the air passage 147, formed in the piston 123, and is liberated through a hole 148 drilled in the rear of the valve 122.

When the balance wheel 109 moves in the opposite direction to that indicated by the arrow 149, the projection 129 also engages the arm 127 but does not actuate the valve 122 as in this instance the arm 128 moves away from the piston rod 124.

Air released from any of the pipes 33, 34, 35, 36 and 37 escapes through air passages 150 or 151, formed in the piston 22 and is liberated through the front of the valve 21 or through a hole 152 drilled in the rear of this valve.

The valves shown in detail in Fig. 3 are so constructed that the air passage 60 is slightly larger in the valve serving the "first gear shift" than in the valve serving the "reverse gear shift", a little larger for "second gear shift" and still larger for "third gear shift".

While the mechanism has been illustrated and described in connection with a motor vehicle, I do not wish to confine it to such use only but intend to use it in connection with any device on which it may be used to advantage.

From the foregoing it will be evident that the present invention remedies many of the defects and disadvantages inherent in the gear shift mechanisms now in use. It entirely eliminates the use of a foot clutch and a gear shift lever, thus removing the most difficult operations now required of the driver. It greatly reduces the number of operations required for starting a car, which is particularly important in the saving of labor and avoiding of fatigue incident to the repeated starting and stopping in traffic.

As the gears are always in mesh, there is no grinding of gears nor any jerking of the car. The car is always in the proper gear ratio for any given speed. There is no "stalling"; no sudden, extra load on the engine or gears; and no "rolling", as the car is always under positive control. By using the "direct shift" the brake power of the engine may be used in going downhill. The choice of direct or automatic shift has many advantages.

The brake pedal may be placed under the left foot of the driver and the accelerator under the right foot, thus making it unnecessary to shift either foot while operating the car. In like manner both hands may be employed on the steering wheel. By providing the slot in the end of the piston rod 17, the brake may be partially applied without shifting into "neutral". This prevents "rolling" and "skidding". As the proper clutch is engaged simultaneously with the releasing of the brake there is no "rolling back" on an upgrade. Many other advantages might be enumerated.

Having described my invention and its operation, what I claim as new and wish to protect by Letters Patent is:

1. In a clutch mechanism of the class described; a gear casing; a series of constant-mesh gear-sets contained in said gear casing; a pneumatic clutch associated with each of said gear-sets; means, actuated by the brake pedal of the vehicle on which the mechanism is employed, for connecting said clutches with a source of compressed air; a governor actuatable by each of said gear-sets; and automatic means for successively disengaging one clutch and engaging another, higher-speed clutch, as the speed of the governor increases.

2. In a clutch mechanism of the class described; a gear casing; a series of constant-mesh gear-sets contained in said gear casing; a pneumatic clutch associated with each of said gear-sets; means, actuated by the brake pedal of the vehicle on which the mechanism is employed for connecting said clutches with a source of compressed air; a governor actuatable by each of said gear sets; and automatic means for successively disengaging one clutch and engaging another, lower-speed clutch, as the speed of the governor decreases.

3. In a clutch mechanism of the class described; a gear casing; a series of constant-mesh gear-sets contained in said gear casing; a pneumatic clutch associated with each of said gear-sets; means, actuated by the brake pedal of the vehicle on which the mechanism is employed, for connecting said clutches with a source of compressed air; a governor actuatable by each of said gear-sets; automatic means for successively disengaging one clutch and engaging another, higher-speed clutch, as the speed of the governor increases and for successively disengaging one clutch and engaging another, lower-speed clutch, as the speed of the governor decreases.

4. In a clutch mechanism of the class described; a gear casing; a series of constant-mesh gear-sets contained in said gear casing; a pneumatic clutch associated with each of said gear-sets; a manually-operated selective valve; a speed-controlled valve connected with said selective valve and an air valve, controlled by the brake pedal of the vehicle on which the mechanism is employed, for connecting each of said clutches to and for disconnecting each of said clutches from a source of compressed air through the selective valve or through both this valve and the speed-controlled valve.

5. In a clutch mechanism of the class described; a gear casing; a series of constant-mesh gear-sets contained in said gear casing; a pneumatic clutch associated with each of said gear sets; a manually-operated selective valve; a speed-controlled valve connected with said selective valve and an air valve, controlled by the brake pedal of the vehicle on which the mechanism is employed, for connecting each of said clutches to and for disconnecting each of said clutches from a source of compressed air through the selective valve or through both this valve and the speed-controlled valve; said air valve being closed only when the brake pedal approaches its extreme braking position.

6. In a clutch mechanism of the class described; a gear casing; a series of constant-mesh gear-sets contained in said casing; a pneumatic clutch associated with each of said gear sets; a manually-operated selective valve; a speed-controlled valve connected with said selective valve each of said clutches comprising a housing secured to one of the gears in the set with which associated; pressure shoes engageable against said housing; duplex cylinders formed in each of said housings; and duplex pistons in each of said cylinders for actuating said pressure shoes when the cylinders are charged from a source of compressed air controlled by the brake pedal of the vehicle on which the mechanism is employed; and passed through the selective valve or through both this valve and the speed-controlled valve.

7. In a clutch mechanism of the class described; a gear casing; a series of constant-mesh gear-sets contained in said casing; a pneumatic clutch associated with each of said gear-sets; a manually-operated selective valve; a speed-controlled valve connected with said selective valve; each of said clutches comprising a housing secured to one of the gears in the set with which associated; pressure shoes engageable against said housing; duplex cylinders formed in each of said housings; duplex pistons in each of said cylinders for actuating said pressure shoes when the cylinders are charged from a source of compressed air controlled by the brake pedal of the vehicle on which the mechanism is employed; and passed through the selective valve or through both this valve and the speed-controlled valve and means for discharging the air from the cylinders in one clutch before the cylinders in another clutch are charged.

8. In a clutch mechanism of the class described; a gear casing; a series of constant-mesh gear-sets contained in said casing; a pneumatic clutch associated with each of said gear-sets; a manually-operated selective valve; a speed-controlled valve connected with said selective valve each of said clutches comprising a housing secured to one of the gears in the set with which associated; pressure shoes engageable against said housing; duplex cylinders formed in each of said housings; duplex pistons in each of said cylinders for actuating said pressure shoes when the cylinders are charged from a source of compressed air controlled by the brake pedal of the vehicle on which the mechanism is employed; and passed through the selective valve or through both this valve and the speed-controlled valve and two sets of cylinders, pistons and pressure shoes connected to one hub so as to serve either one of two housings.

9. In a clutch mechanism of the class described; a gear casing; a series of constant-mesh gear-sets contained in said casing; a pneumatic clutch associated with each of said gear-sets; a source of compressed air; an air valve actuated by the brake pedal of the vehicle on which the mechanism is employed; a selective valve for admitting compressed air to any one of said clutches when the brake-pedal valve is opened; a lever associated with the steering wheel of the vehicle for setting said selective valve; and an additional air valve, actuated by the acceleration of the vehicle for disengaging one clutch and engaging another.

HORACIO E. PÉREZ.